(12) United States Patent
Foreman

(10) Patent No.: US 7,862,090 B1
(45) Date of Patent: Jan. 4, 2011

(54) PLUG-IN FITTING FOR DIRECT CONNECTION TO HOUSING

(75) Inventor: Benny Ray Foreman, Broken Arrow, OK (US)

(73) Assignee: R.L. Hudson & Company, Broken Arrow, OK (US)

( * ) Notice: Subject to any disclaimer, the term of this patent is extended or adjusted under 35 U.S.C. 154(b) by 345 days.

(21) Appl. No.: 11/966,661

(22) Filed: Dec. 28, 2007

(51) Int. Cl.
*F16L 19/00* (2006.01)
(52) U.S. Cl. .................. 285/347; 285/98; 285/148.27; 285/203; 285/280
(58) Field of Classification Search ............... 285/98, 285/139.2, 148.15, 148.4, 272–273, 276, 285/278, 280–281, 347, 351–352, 375, 148.27, 285/203, 208
See application file for complete search history.

(56) References Cited

U.S. PATENT DOCUMENTS

| | | | | |
|---|---|---|---|---|
| 594,526 | A | * | 11/1897 | Glauber ...................... 285/210 |
| 1,049,283 | A | * | 12/1912 | Westphal ..................... 285/209 |
| 2,241,293 | A | * | 5/1941 | Campbell ................. 285/154.1 |
| 2,344,740 | A | * | 3/1944 | Shaff ........................... 285/277 |
| 2,804,319 | A | * | 8/1957 | Weber ......................... 285/316 |
| 3,152,815 | A | | 10/1964 | Barragato et al. |
| 3,453,005 | A | | 7/1969 | Foults |
| 3,603,621 | A | | 9/1971 | Parsons |
| 3,666,300 | A | * | 5/1972 | Russell ........................ 285/316 |
| 3,711,125 | A | | 1/1973 | Dehar |
| 3,716,257 | A | * | 2/1973 | Hackman et al. ............ 285/210 |
| 3,773,360 | A | * | 11/1973 | Timbers ...................... 285/307 |
| 4,035,005 | A | | 7/1977 | DeVincent et al. |
| 4,131,379 | A | | 12/1978 | Gordy et al. |
| 4,135,745 | A | | 1/1979 | Dehar |
| 4,451,069 | A | | 5/1984 | Melone |
| 4,462,620 | A | | 7/1984 | Bambenek et al. |
| 4,621,937 | A | | 11/1986 | Maccuaig |
| 4,623,171 | A | * | 11/1986 | Wilson ......................... 285/42 |
| 4,637,640 | A | | 1/1987 | Fournier et al. |
| 4,647,082 | A | | 3/1987 | Fournier et al. |
| 4,781,400 | A | | 11/1988 | Cunningham |
| 4,793,639 | A | | 12/1988 | Glover et al. |
| 4,923,228 | A | | 5/1990 | Laipply |
| 4,966,398 | A | | 10/1990 | Peterson |
| 4,991,882 | A | | 2/1991 | Gahwiler |

(Continued)

*Primary Examiner*—Aaron Dunwoody
*Assistant Examiner*—Fannie Kee
(74) *Attorney, Agent, or Firm*—Head, Johnson & Kachigian, P.C.

(57) ABSTRACT

A plug in fitting for direct connection into an aperture in a housing. The fitting includes an inner cylindrical member having a body with an external diameter, a first end, and an opposed, second end having a radially extending cam. An outer sleeve includes a body and an inner diameter slightly larger than the external diameter of the inner body. A first end of the outer sleeve terminates in a radially extending flange larger than the aperture. A second end of the outer sleeve is opposed to the first end. At least one tab extends radially inward from the body of the outer sleeve, wherein the first end of the inner cylindrical member is inserted through the outer sleeve to form a combined assembly, and wherein the combined assembly is inserted through the aperture so that the radially extending flange of the outer sleeve rests against the housing and wherein the inner cylindrical member is rotated with respect to the outer sleeve so that the radially extending cam of the inner cylindrical member engages the housing and locks the assembly to the housing.

4 Claims, 6 Drawing Sheets

U.S. PATENT DOCUMENTS

| | | | |
|---|---|---|---|
| 5,022,687 A * | 6/1991 | Ariga | 285/321 |
| 5,048,875 A | 9/1991 | Usui et al. | |
| 5,064,227 A | 11/1991 | Spors et al. | |
| 5,181,839 A | 1/1993 | Tuckey | |
| 5,261,709 A | 11/1993 | McNaughton et al. | |
| 5,303,963 A | 4/1994 | McNaughton et al. | |
| 5,427,263 A | 6/1995 | Bowles | |
| 5,518,276 A | 5/1996 | Gunderson | |
| 5,533,761 A | 7/1996 | Ostrander et al. | |
| 5,542,712 A | 8/1996 | Klinger et al. | |
| 5,586,792 A | 12/1996 | Kalahasthy et al. | |
| 5,700,040 A | 12/1997 | Kujawski | |
| 5,707,085 A | 1/1998 | Kubiak | |
| 5,711,552 A | 1/1998 | Hogue et al. | |
| 5,772,263 A | 6/1998 | Lewis | |
| 5,887,911 A | 3/1999 | Kargula | |
| 5,988,705 A | 11/1999 | Norkey | |
| 6,068,303 A | 5/2000 | Hollnagle | |
| 6,079,750 A | 6/2000 | Kacines | |
| 6,149,206 A | 11/2000 | DiRocco | |
| 6,170,886 B1 | 1/2001 | Bartholomew | |
| 6,231,088 B1 * | 5/2001 | Balthazard et al. | 285/209 |
| 6,315,333 B1 | 11/2001 | Collins | |
| 6,443,496 B2 | 9/2002 | Campau | |
| 6,595,556 B1 | 7/2003 | Zenko et al. | |
| 6,619,343 B2 | 9/2003 | Stoddard et al. | |
| 6,725,788 B2 * | 4/2004 | McCartney et al. | 111/175 |
| 6,843,510 B2 | 1/2005 | Leymarie et al. | |
| 6,945,422 B2 | 9/2005 | Beyer et al. | |
| 7,025,387 B2 | 4/2006 | Twardawski et al. | |
| 7,090,257 B2 | 8/2006 | Werth | |
| 7,108,297 B2 | 9/2006 | Takayanagi et al. | |
| 7,238,047 B2 | 7/2007 | Saettele et al. | |
| 2002/0130515 A1 | 9/2002 | Mlyajima et al. | |
| 2004/0251682 A1 | 12/2004 | Pyron | |
| 2005/0006897 A1 | 1/2005 | Davidson | |
| 2005/0110274 A1 | 5/2005 | Yoshino | |
| 2005/0167980 A1 | 8/2005 | Bauer et al. | |
| 2005/0206161 A1 | 9/2005 | Ogiso et al. | |
| 2005/0258646 A1 | 11/2005 | Gunderson | |
| 2006/0244258 A1 | 11/2006 | Baumgartner | |

\* cited by examiner

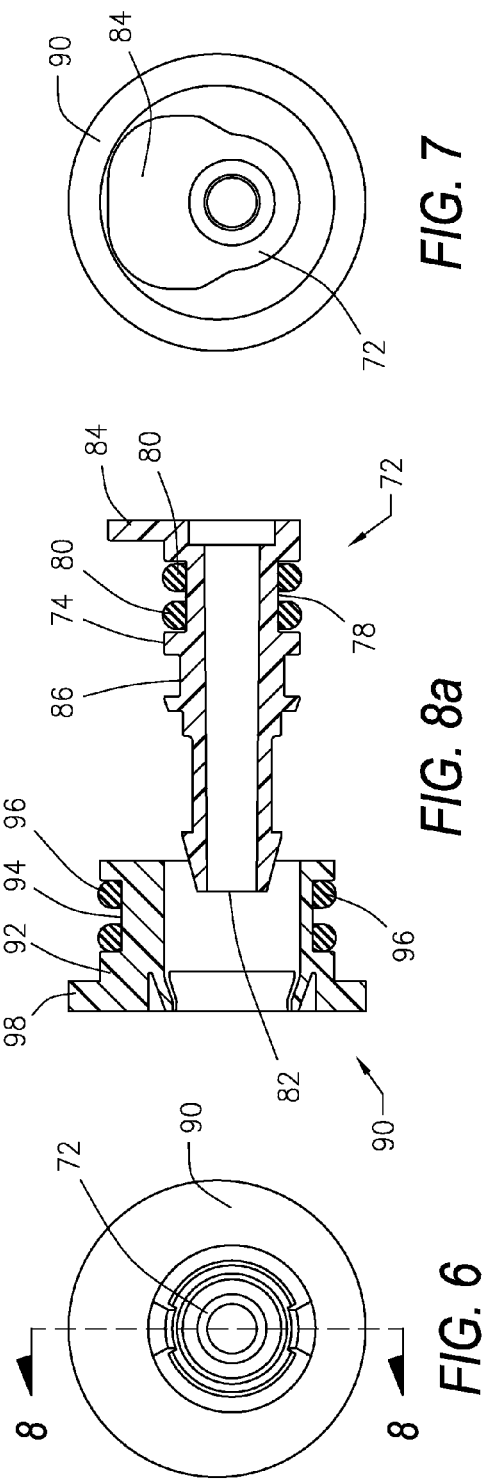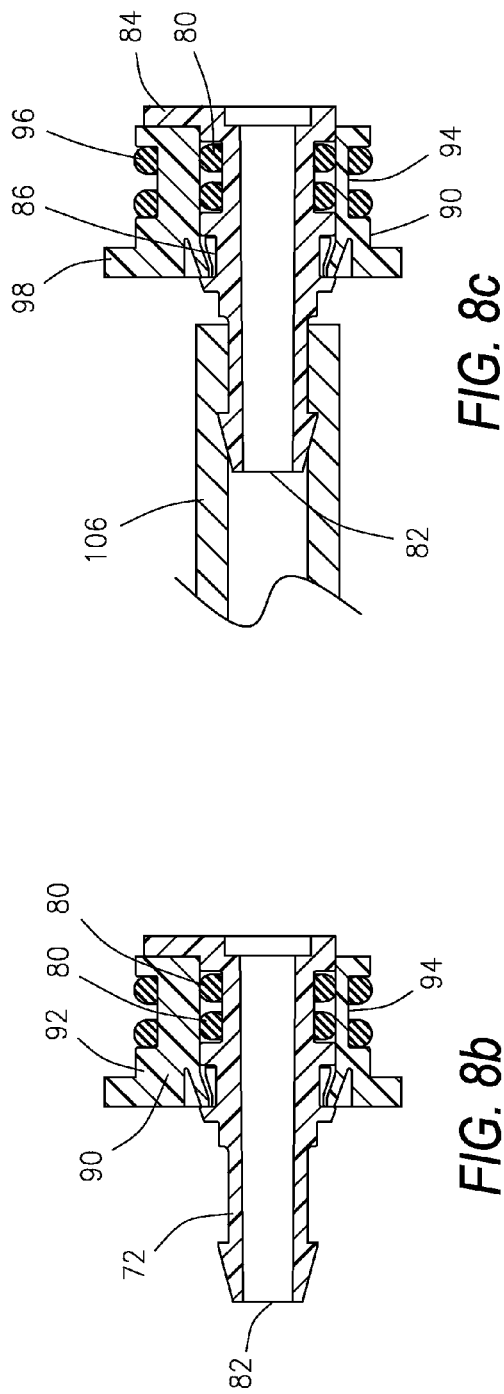

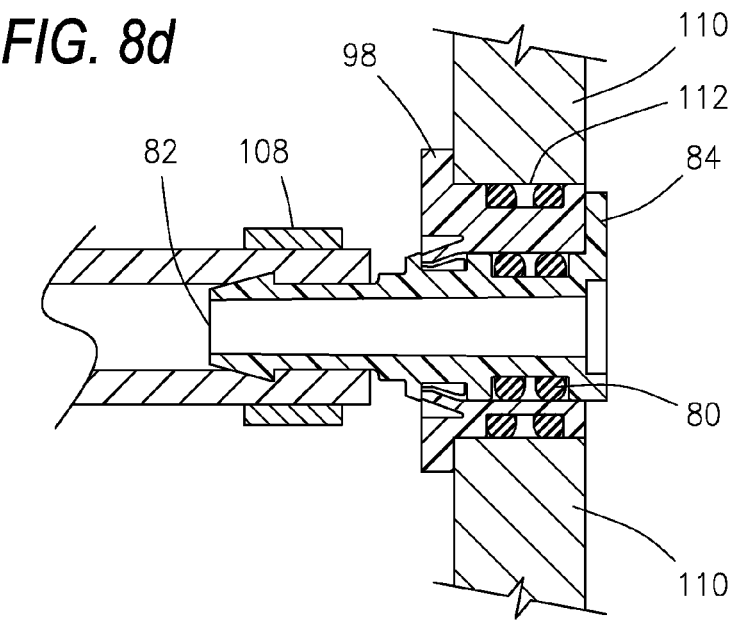
FIG. 8d
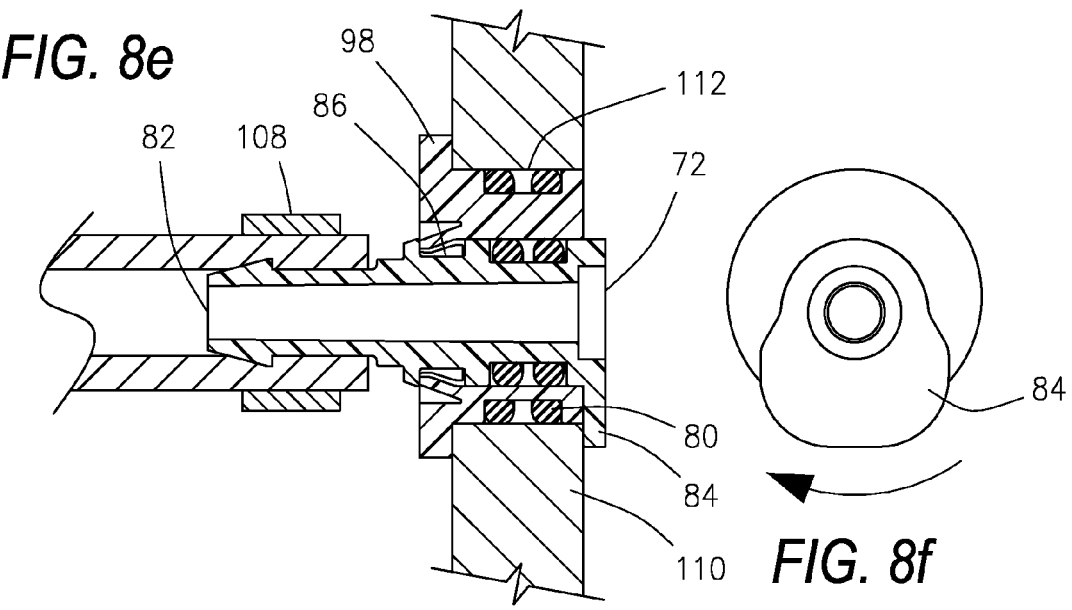
FIG. 8e
FIG. 8f

PLUG-IN FITTING FOR DIRECT CONNECTION TO HOUSING

BACKGROUND OF THE INVENTION

1. Field of the Invention

The present invention is directed to a blind, plug-in or quick connect coupling between a housing having an opening and a hose or tube.

2. Prior Art

In a number of applications, it is desirable to provide a quick connect or plug-in installation for gas or liquid fluids in order to provide a sealed connection between a housing or wall having a bore, aperture or opening therethrough and a hose or tube. In one type of application, the housing is cast with an opening.

While a threaded connection is a possible alternative, this may involve additional steps in providing threading in the opening of the housing. Additionally, a threaded connection requires proper tightening during installation in order to avoid over tightening or under tightening. Additionally, in some applications, space requirements make it difficult to install and utilize a threaded connection.

Plug-in or quick connect types of couplings may be used in various applications, such as automotive applications including emission systems, crank case ventilation systems, and engine vacuum systems. Other applications for plug-in or quick connect couplings include appliances and fuel storage containers.

Various types of tube to tube connectors are known, such as U.S. Pat. Nos. 3,152,815 and 3,453,005, which connect one tube or hose to another tube or hose.

Prior connectors include Baumgartner (U.S. Publication No. US 2006/0244258) which discloses a quick connect coupling for a pipe with a coupling body 3 having an opening 4.

Mlyajima et al. (U.S. Publication No. US 2002/0130515) discloses a press-siphon fit tubular connector with a plurality of annular projections 27.

Gordy et al. (U.S. Pat. No. 4,131,379) discloses a conduit anchoring device having an inner sleeve member 18, an outer sleeve member 20 concentrically arranged about the inner sleeve member in an annular collar member 22 concentrically arranged around the outer sleeve member. The anchoring assembly is inserted into an opening in a wall to cause resilient prongs 36 to be compressed by the walls of the support opening. When the collar flange portion 40 engages a face of the support member 16, the prongs 36 spring radially apart so that the free extremities engage the opposite face of the support member.

Zenko et al. (U.S. Pat. No. 6,595,556) discloses a quick connect coupling which requires a recessed shoulder in a wall or housing.

Notwithstanding the foregoing, there remains a need for a simple, press fit plug-in installation fitting for direct connection of a hose or tube to an opening in a wall or housing.

There also remains a need for a simple, press fit, plug-in installation fitting that may be secured to a wall structure by blindly installing into a plain hole.

SUMMARY OF THE INVENTION

The present invention is directed to a plug-in fitting for direct connection to an opening or aperture in a wall or housing. In one embodiment, the fitting includes an inner cylindrical member having a body with an external diameter. One or more recesses may be provided into the body to receive an O-ring seal or seals. The inner cylindrical member includes a first end connectable to a hose or tube. The inner cylindrical member also includes a second conical end opposed to the first end terminating in a diameter larger than the diameter of the body. The inner cylindrical member also includes an annular slot which circumnavigates the body of the inner cylindrical member.

The fitting also includes an outer sleeve having a cylindrical body with one or more recesses to receive an O-ring seal in each recess.

The body of the outer sleeve includes an inner diameter slightly larger than the external diameter of the inner cylindrical member. The outer sleeve also includes a first end terminating in a radially extending flange larger than the diameter of the opening or aperture in the housing.

The outer sleeve also includes a second end opposed to the first end having a plurality of fingers, each of which terminates in a radially extending prong.

Additionally, at least one tab extends from the outer sleeve adjacent the radially extending flange.

In order to assemble and install, the inner cylindrical member will be inserted into the outer sleeve with the first end entering the opening of the outer sleeve.

Once the inner cylindrical member has been inserted in to the outer sleeve, the combined assembly is thereafter inserted into the aperture opening of the housing.

The second conical end of the inner cylindrical member and the second end of the outer sleeve with the radially extending prongs are inserted into the aperture of the housing until the radially extending flange of the outer sleeve abuts one side of the housing.

Thereafter, the inner cylindrical member is moved while the outer sleeve is stationery. The inner cylindrical member is moved in a second direction reverse to the first direction so that the tabs of the outer sleeve move into the annular slot of the inner member. At the same time, the second, conical end of the inner cylindrical member forces each of the radially extending prongs extending from the fingers to move radially outward and engage the opposed side of the housing. Accordingly, the outer sleeve locks the housing between the radially extending flange and the prongs.

Additionally, the inner member is locked in place by virtue of the tabs of the outer sleeve being locked in the annular slot of the inner cylindrical member.

BRIEF DESCRIPTION OF THE DRAWINGS

FIG. 4 illustrates a perspective view of an inner cylindrical member and an outer sleeve of a plug-in fitting constructed in accordance with a second preferred embodiment of the present invention, while

FIG. 6 illustrates an end view of the inner cylindrical member and outer sleeve shown in FIGS. 4 and 5, while FIG. 7 illustrates an opposed end view; and FIGS. 8a, 8b, 8c, 8d, 8e and 8f illustrate sequential, sectional views of the assembly and installation of the present invention shown in FIGS. 4-7.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
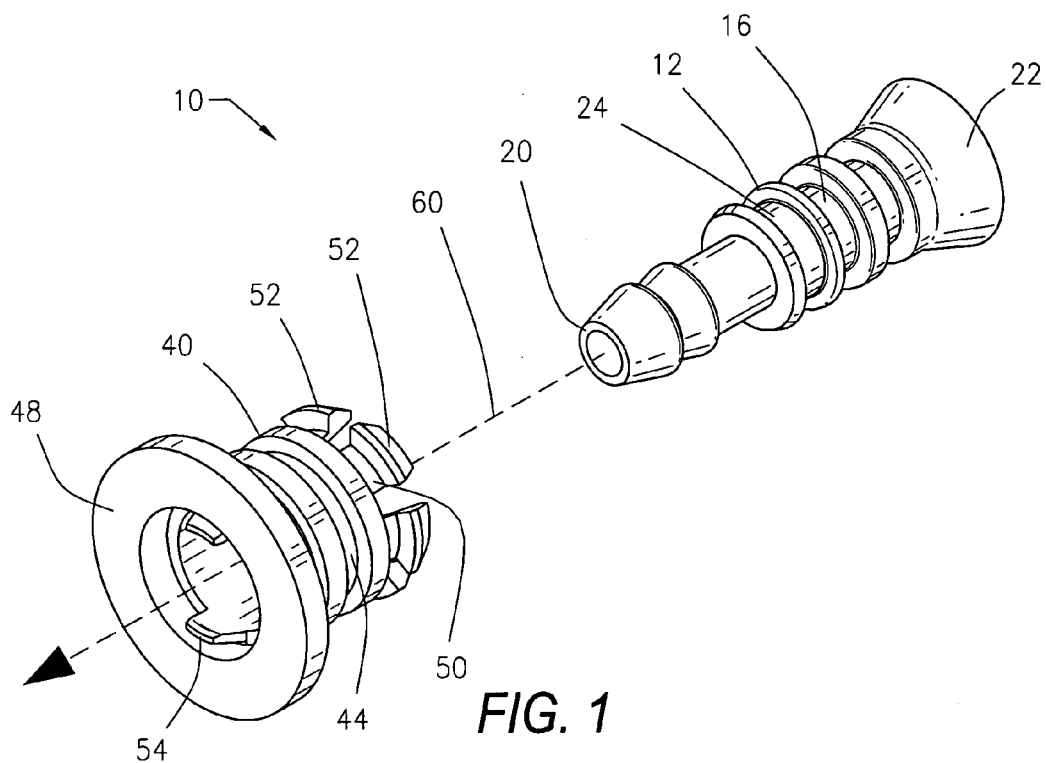
FIG. 1 illustrates a perspective view of an inner cylindrical member and an outer sleeve of a plug-in fitting constructed in accordance with a first preferred embodiment of the present invention.
Figure 2:
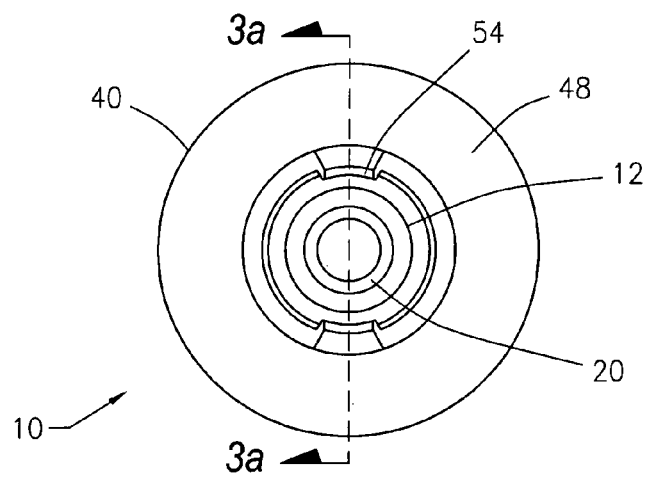
FIG. 2 illustrates an end view of the inner cylindrical member and the outer sleeve shown in FIG. 1.

Referring to the drawings in detail, FIGS. 1 through 3 disclose a first, preferred embodiment of a plug-in fitting 10 for direct connection to an aperture in a housing. The fitting 10 includes an inner cylindrical member 12 and an outer sleeve 40, each of which might be molded from plastic or other synthetic material.

FIG. 1 shows the inner cylindrical member 12 and the outer sleeve 40 prior to assembly and installation. FIG. 2 illustrates an end view of the inner cylindrical member 12 with the outer sleeve 40.

FIGS. 3a through 3e illustrate one sequential sequence of assembly and installation of the plug-in fitting 10. Section line 3a-3a shows a sectional view taken through FIG. 2.

Figure 3A:
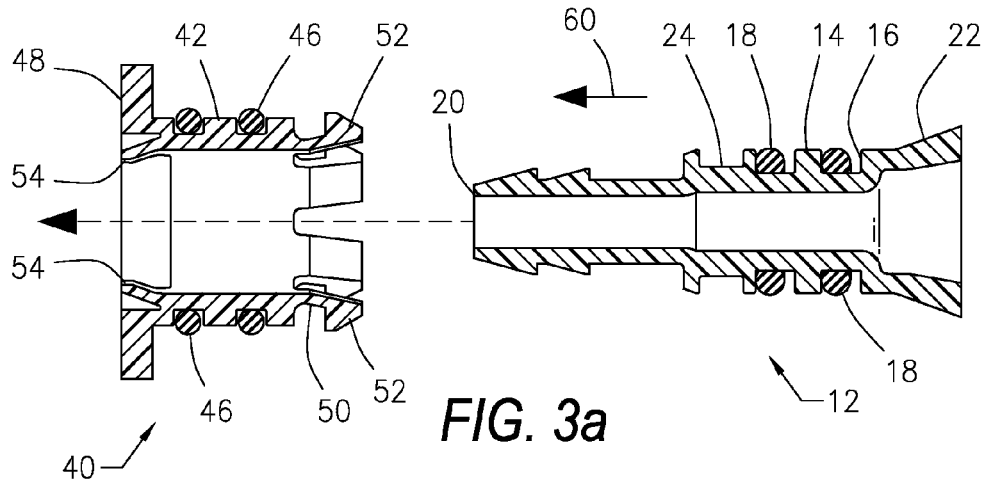
FIGS. 3a, 3b, 3c, 3d and 3e illustrates sequential, sectional views of the assembly and installation of the plug-in fitting of the present invention shown in FIGS. 1 and 2.

The inner cylindrical member 12 includes a body having an external diameter 14, as easily seen in FIG. 3a. One or more recesses 16 may be provided in the body in order to receive an O-ring seal 18 in each recess.

The inner cylindrical member 12 includes a first end 20 which will be connected to a hose or tube (not shown in FIG. 1, 2, 3a or 3b). The first end 20 may be cylindrical, or may take other configurations, such as a conical annular projection.

The inner cylindrical member 12 also includes a second conical end 22 opposed to the first end 20 and terminating in a diameter larger than the body diameter 14.

The inner cylindrical member 12 also includes an annular slot 24 which circumnavigates the body of the inner cylindrical member 12.

The fitting 10 also includes an outer sleeve 40 having a cylindrical body 42. The body 42 of the outer sleeve 40 may include one or more recesses 44 to receive an O-ring seal 46 in each recess 44.

The body 42 of the outer sleeve 40 also includes an inner diameter slightly larger than the external diameter of the inner cylindrical member 12. The outer sleeve 40 also includes a first end terminating in a radially extending flange 48 larger than the diameter of the opening or aperture in the housing (not shown in FIGS. 1 and 2).

The outer sleeve 40 also includes a second end opposed to the first end having a plurality of fingers 50, each of which terminates in a radially extending prong 52. Each of the fingers 50 is capable of flexing slightly.

Additionally, at least one tab 54 extends from the outer sleeve 40 adjacent the radially extending flange 48. In the embodiment shown in FIGS. 1 through 3, two tabs 54 are employed although a different number of tabs may be utilized within the spirit and scope of the present invention.

The sequential steps utilized in one preferred method of assembly and installation of the present invention are illustrated in FIGS. 3a, 3b, 3c, 3d and 3e. Initially, an O-ring seal 18 will be inserted in each recess 16 within the inner cylindrical member 12. As illustrated by arrow 60 in FIGS. 1 and 3a, the inner cylindrical member 12 will be inserted into the outer sleeve 40 with the first end 20 entering the opening of the outer sleeve 40.

Figure 3B:
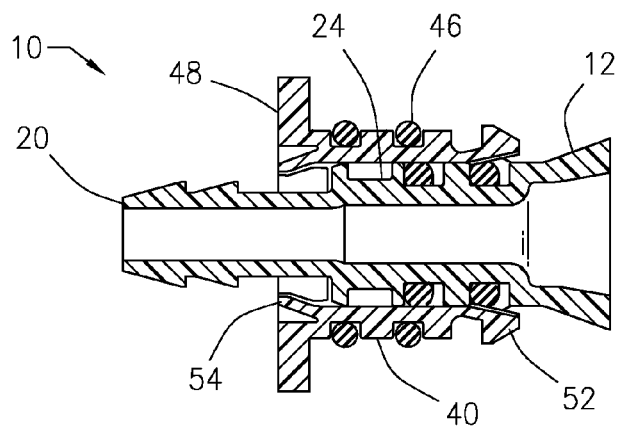

As seen in FIG. 3b, the inner cylindrical member 12 will be inserted into the outer sleeve 40 until the second conical end of the inner member 12 is adjacent the radially extending prongs 52 and until the first end 20 of the inner cylindrical member 12 extends beyond the radially extending flange 48 of the outer sleeve.

As seen in FIG. 8c, a hose or tube 106 may be slipped on or over the first end 82 of the inner cylindrical member 72. The hose or tube 106 may be secured to the inner cylindrical member 72 by the conical end which forms a barb into the interior diameter of the hose. Various other securing mechanisms may be used, such as a hose clamp 64 shown in FIG. 3d. It will be understood that the hose or tube 62 may be installed at a later stage of the process.

Figure 3C:
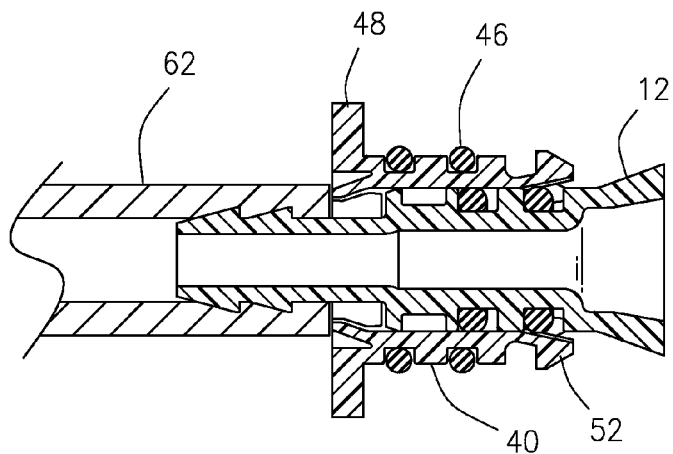
Figure 3D:
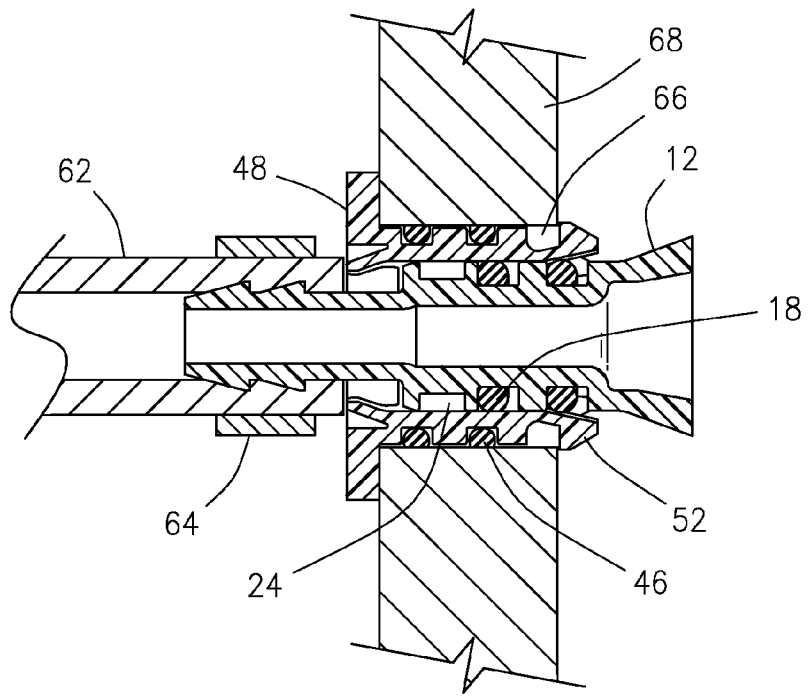
Figure 3E:
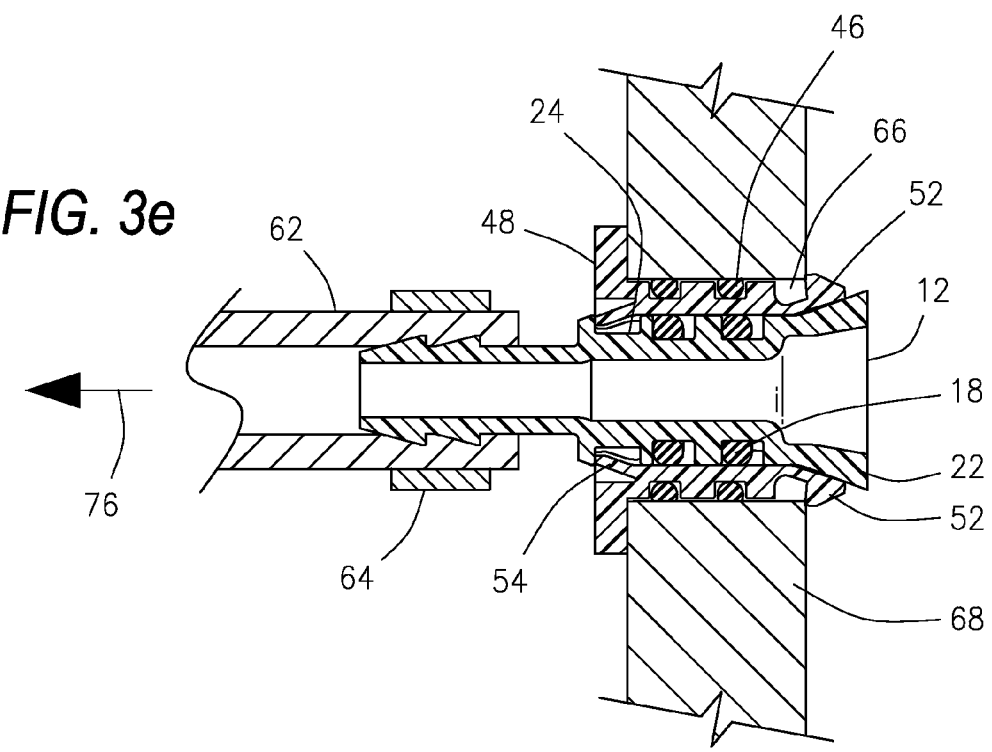

Once the inner cylindrical member 12 has been inserted into the outer sleeve 40, the combined assembly is thereafter inserted into the aperture or opening 66 of the housing 68 as seen in FIGS. 3d and 3e.

As will be seen in FIGS. 3d and 3e, the housing 68 has opposed walls or sides. The second conical end 22 of the inner cylindrical member 12 and the second end of the outer sleeve 40 with the radially extending prongs 52 are inserted into the aperture 66 of the housing 68 until the radially extending flange 48 of the outer sleeve 40 abuts one side of the housing 68. The O-rings 46 form a seal with the aperture 66 and prevent fluid from passing therebetween.

Thereafter, as shown in FIG. 3c, the inner cylindrical member 12 is moved while the outer sleeve is stationery. The inner cylindrical member is moved in a second direction reverse to the first direction so that the tabs 54 of the outer sleeve move into the annular slot 24 of the inner member. The second direction of movement is shown by arrow 76. At the same time, the second, conical end 22 of the inner cylindrical member 12 forces each of the radially extending prongs 52 extending from the fingers 50 to move radially outward and engage the opposed side of the housing 68. Accordingly, the outer sleeve 40 locks the housing 68 between the radially extending flange 48 and the prongs 52.

Additionally, the inner member 12 is locked in place by virtue of the tabs 54 of the outer sleeve being locked in the annular slot of the inner cylindrical member 12. Finally, the O-rings 18 form a seal between the inner cylindrical member 12 and the outer sleeve 40 to permit any passage of fluid.

Provisions could be made for preventing rotation of the combined assembly with respect to the housing 68.

FIGS. 4 through 8 illustrate a second, preferred embodiment of a fitting 70 and a method of installation in accordance with the present invention.

Figure 4:
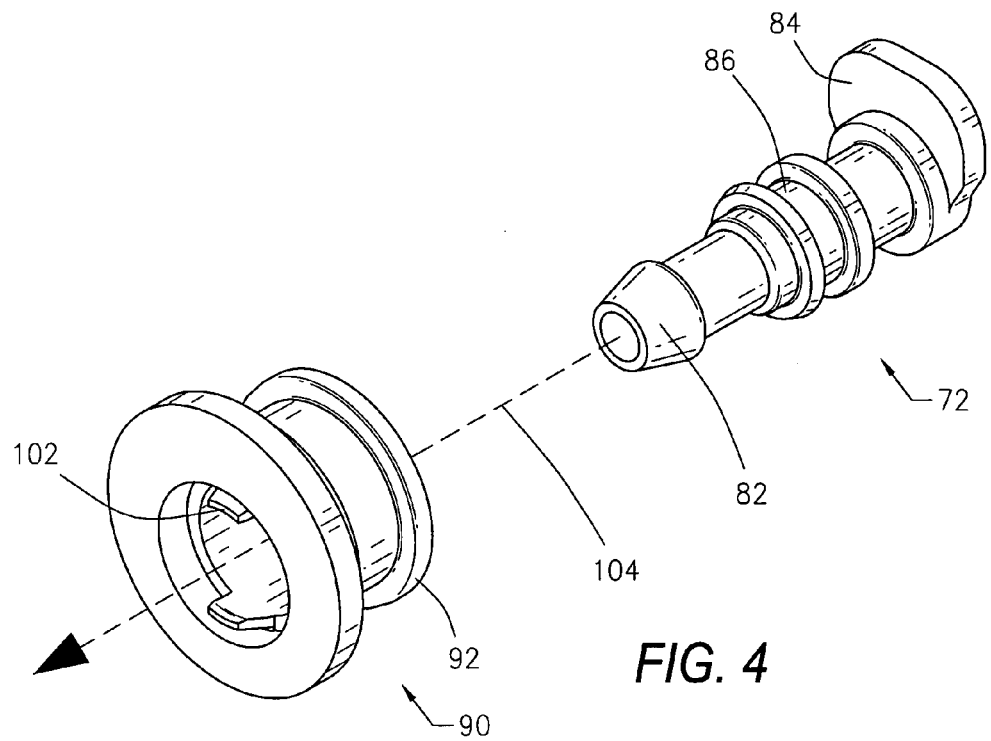
Figure 5:
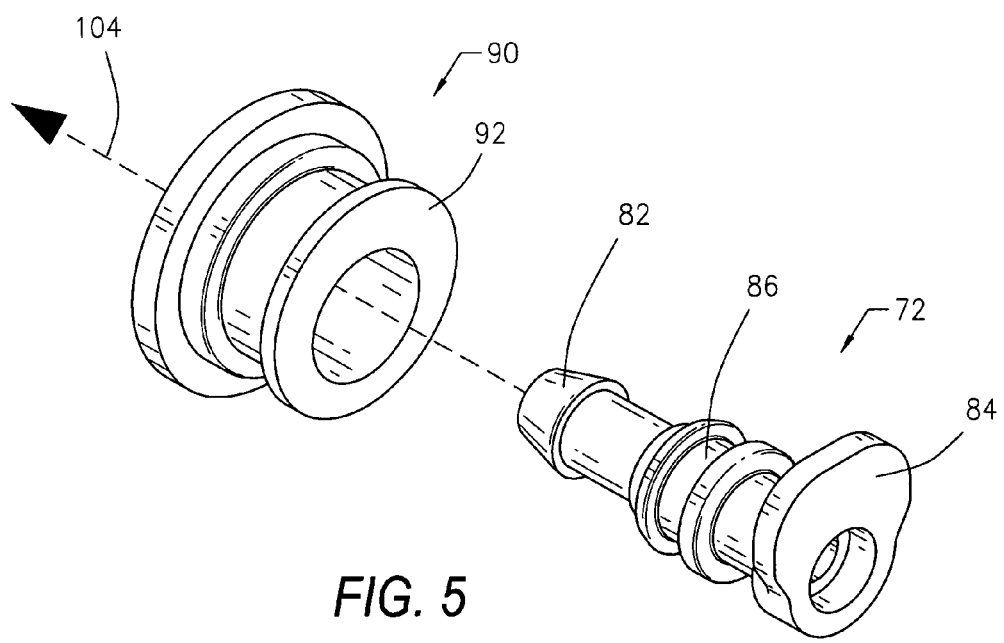
FIG. 5 illustrates an alternate perspective view.

The fitting 70 includes an inner cylindrical member 72 and an outer sleeve 90, each of which might be molded from plastic or other synthetic material. FIGS. 4 and 5 show the inner cylindrical member 72 and the outer sleeve 90 prior to assembly and installation.

The inner cylindrical member 72 includes an external body diameter 74 seen in FIG. 8a.

One or more recesses 78 may be provided in the body of the inner cylindrical member 12 in order to receive an O-ring or O-ring seals 80 in the recess.

The inner cylindrical member 72 includes a first end 82 which will be connected to a hose or tube (not shown in FIG. 4-7, 8a or 8b). The first end 82 may be cylindrical, or may take other configurations, such as a conical annular projection. Opposed to the first end 82 is a second end terminating in a radially extending cam 84.

The inner cylindrical member 72 also includes an annular slot 86 which circumnavigates the body of the inner cylindrical member 72.

The second embodiment of the fitting 70 also includes an outer sleeve 90 having a body 92. The body of the outer sleeve 90 may include one or more recesses 94 to receive an O-ring or O-rings seals 96.

The body 92 of the outer sleeve 90 also includes an inner diameter slightly larger than the external diameter of the inner cylindrical member. Importantly, as can be seen in FIG. 8a and other views, the inner diameter of the outer sleeve 90 is not concentric but eccentric.

The outer sleeve 90 includes a first end terminating a radially extending flange 98 larger than the diameter of an opening or aperture in the housing (not shown in FIG. 4, 5, 6 or 7). The outer sleeve 90 also includes a second end opposed to the first end.

Additionally, at least one tab 102 extends from the outer sleeve 90 adjacent the radially extending flange 98. In the embodiment shown in FIGS. 4 through 8, two tabs 102 are employed, although a different number of tabs may be utilized within the spirit and scope of the present invention.

The sequential steps utilized in one preferred method of assembly and installation of the present invention are illustrated in FIGS. 8a, 8b, 8c, 8d, 8e and 8f. Initially, an O-ring seal or O-ring seals 80 will be inserted in the recess 78 within the inner cylindrical member 72. As illustrated by arrow 104 in FIG. 4, the inner cylindrical member 72 will be inserted into the outer sleeve 90 with the first end 82 entering the opening of the outer sleeve 90.

As seen in FIG. 8b, the inner cylindrical member 72 will be inserted into the outer sleeve 90 until the tabs 102 of outer sleeve 90 engage in the annular slot 86 of inner member 72 and until the first end 82 of the inner cylindrical member 72 extends beyond the radially extending flange 98 of the outer sleeve 90.

As seen in FIG. 8c, a hose or tube 106 may be slipped on or over the first end 82 of the inner cylindrical member 70. The hose or tube 106 may be secured to the inner cylindrical member 70 by the conical end which forms a barb into the interior diameter of the hose. Various other securing mechanisms may be used, such as a hose clamp 108 shown in FIGS. 8d and 8e. It will be understood that the hose or tube may be installed at a later stage.

Once the inner cylindrical member 72 is inserted into the outer sleeve 90, the combined assembly is thereafter inserted into the aperture 112 of the housing 110. The cam 84 is arranged so it does not extend beyond the outer sleeve.

As will be seen in FIGS. 8d and 8e, the housing 110 has opposed walls or sides. The second end of the inner cylindrical member and the second end of the outer sleeve are inserted into the aperture 112 of the housing 110 until the radially extending flange 98 abuts one side of the housing 110. The O-rings 96 form a seal and prevent fluid from passing therebetween.

Finally, as shown in FIGS. 8e and 8f, the inner cylindrical member 72 is rotated with respect to the outer sleeve 90 so that the cam 84 extends beyond the outer sleeve and engages the opposed wall of the housing 110. The combined assembly of the inner cylindrical member and the outer sleeve is thereby locked as the cam surface 84 tightens against the inner wall of housing 110.

Provisions could be made for preventing or hampering further rotation of the inner cylindrical member with respect to the outer sleeve.

Whereas, the present invention has been described in relation to the drawings attached hereto, it should be understood that other and further modifications, apart from those shown or suggested herein, may be made within the spirit and scope of this invention.

What is claimed is:

1. A plug-in fitting for direct connection to an aperture in a housing, which fitting comprises:
   an inner cylindrical member having a body with an external diameter, a first end, and an opposed, second end having a radially extending cam;
   an outer sleeve having a first end, a second end and a body wherein said body of said outer sleeve has an inner diameter slightly larger than said external diameter of said body of said inner cylindrical member and said inner diameter of said body of said outer sleeve is eccentric to an outer diameter of said body of said outer sleeve;
   said first end of said outer sleeve terminating in a radially extending flange larger than said aperture;
   said second end of said outer sleeve opposed to said first end; and
   at least one tab extending radially inward from said body of said outer sleeve, wherein said first end of said inner cylindrical member is inserted through said outer sleeve to form a combined assembly, and wherein said combined assembly is inserted through said aperture so that said radially extending flange of said outer sleeve rests against said housing and wherein said inner cylindrical member is rotated with respect to said outer sleeve so that said radially extending cam of said inner cylindrical member engages said housing and locks said assembly to said housing.

2. A plug-in fitting as set forth in claim 1 wherein said inner cylindrical member includes at least one recess a plurality of recesses to receive a plurality of O-rings therein.

3. A plug-in fitting as set forth in claim 1 wherein said first end of said inner cylindrical member terminates in a conical annular projection.

4. A plug-in fitting as set forth in claim 1 including an annular slot which circumnavigates the body of said inner cylindrical member, said annular slot receiving said radially inwardly extending tab of said body of said outer sleeve.

* * * * *